United States Patent [19]
Sartore et al.

[11] Patent Number: 6,012,103
[45] Date of Patent: Jan. 4, 2000

[54] BUS INTERFACE SYSTEM AND METHOD

[75] Inventors: Ronald H. Sartore, San Diego; Steven P. Larky, Del Mar, both of Calif.

[73] Assignee: Cypress Semiconductor Corp., San Jose, Calif.

[21] Appl. No.: 08/886,923

[22] Filed: Jul. 2, 1997

[51] Int. Cl.⁷ .................................................. G06F 13/368
[52] U.S. Cl. ..................... 710/8; 710/9; 710/10
[58] Field of Search ........................... 379/395; 709/220, 709/250; 711/114, 115, 130; 713/100; 710/9

[56] References Cited

U.S. PATENT DOCUMENTS

| | | |
|---|---|---|
| 4,641,261 | 2/1987 | Dwyer et al. . |
| 4,862,355 | 8/1989 | Newman et al. . |
| 5,289,580 | 2/1994 | Latif et al. . |
| 5,428,748 | 6/1995 | Davidson et al. ........................... 710/9 |
| 5,488,657 | 1/1996 | Lynn et al. ............................... 379/395 |
| 5,574,859 | 11/1996 | Yeh . |
| 5,577,213 | 11/1996 | Avery et al. . |
| 5,586,268 | 12/1996 | Chen et al. . |
| 5,606,672 | 2/1997 | Wade . |
| 5,615,344 | 3/1997 | Corder . |
| 5,634,074 | 5/1997 | Devon et al. ............................ 395/828 |
| 5,671,355 | 9/1997 | Collins ..................................... 709/250 |
| 5,687,346 | 11/1997 | Shinohara ............................... 711/130 |
| 5,701,429 | 12/1997 | Legvold et al. ........................ 711/114 |
| 5,794,033 | 8/1998 | Aldebert et al. ........................ 713/100 |
| 5,802,558 | 9/1998 | Pierce ...................................... 711/115 |
| 5,838,907 | 11/1998 | Hansen ..................................... 709/220 |

*Primary Examiner*—Thomas C. Lee
*Assistant Examiner*—Chien Yuan
*Attorney, Agent, or Firm*—Christopher P. Maiorana, P.C.

[57] ABSTRACT

A system and method for reconfiguring a peripheral device connected by a computer bus and port to a host from a first generic configuration to a second manufacturer specific configuration is provided in which the configuration of a peripheral device may be electronically reset. A peripheral interface device for a standardized computer peripheral device bus and port is also provided in which a physical disconnection and reconnection of the peripheral device is emulated to reconfigure the bus and port for a particular peripheral device.

33 Claims, 7 Drawing Sheets

BUS INTERFACE SYSTEM AND METHOD

BACKGROUND OF THE INVENTION

This invention relates generally to a system and method for connecting a computer system to a computer bus and in particular to a system and method for interfacing a computer system to a standard universal serial peripheral device bus.

In a typical computer system, a computer having a microprocessor may be connected to a plurality of peripheral devices, such as a printer or a modem, by one or more electrical buses and several different communications ports. Different peripheral devices have interfaces with different form factors and electrical characteristics, and these communications ports are used for a variety of different peripheral devices. A typical desktop computer may have a modem, a printer, a keyboard and a mouse connected to it. The modem may be connected to a serial port, the printer may be connected to a parallel port, the keyboard may be connected to a dedicated keyboard port and the mouse may be connected to a dedicated mouse port. Each of these communication ports may have different electrical characteristics, require different connectors and each has a different cable that runs from the peripheral device to the connector which connects to the computer communications port. For example, the serial port, the parallel port, the keyboard port and the mouse port all have different characteristics, cables and different connectors. The result is a large number of diverse interfaces and cables that must be used. In addition, the electrical design of these communications ports typically requires that the computer be turned off before connecting and/or disconnecting a peripheral device from the port because the port may be permanently damaged otherwise. This prompted the design of a single standardized peripheral interface connection system which reduces the need for multiple connectors and cables, and permits the connection and disconnection of a peripheral device while the computer is turned on.

A new emerging technology called the Universal Serial Bus (USB) is a system intended to create a single standardized peripheral device connection system. The USB makes the task of connecting peripheral devices to computers easier and more reliable since it uses a standardized connector and form factor, and makes operating those peripheral devices with the computer, easier and more reliable than with the various different types of communication ports. The computer to which these peripheral devices are connected by the USB is known as the "host computer". The USB replaces the multiple cable and connector types with a single standardized connection system. The USB also permits the connection and disconnection of USB compatible peripheral devices while the computer is turned on which eliminates the typical turning off and rebooting of the computer in order to connect or disconnect a peripheral device to the computer.

When a peripheral device is first connected to the USB and the host computer through a standard USB communications port, the presence of the connected peripheral device is detected and a configuration process of the USB for the connected peripheral device, known as device enumeration, begins. The enumeration process assigns a unique USB address to the connected peripheral device, queries the connected peripheral device about its requirements and capabilities, writes data about the connected peripheral device into the host computer's operating system, and loads the appropriate software device driver from a storage location into the host computer's operating system. During the query, a data table stored in the peripheral device, which contains the particular peripheral device's configuration information, is read from the peripheral device into the host computer's memory. Upon completion of the enumeration process, the connected peripheral device is recognized by the host computer's operating system and may be used by application software being executed by the microprocessor of the host computer. The association of the device with the software device driver cannot be subsequently changed.

In a serial bus system, such as the USB, the only opportunity for associating software device drivers with a peripheral device is at the time when the peripheral device is plugged into the USB and the enumeration process occurs. Thus, to alter the configuration or personality of a peripheral device, such as downloading new code or configuration information into the memory of the peripheral device, the host computer system must detect a peripheral device connection or a disconnection and then a reconnection.

The USB provides a number of advantages, as described above, over standard peripheral device connection techniques. The USB, however, does not provide a system and method for easily altering the configuration data for a peripheral device. In addition, the USB also does not provide a method for easily changing the software device driver associated with a particular peripheral device.

Thus, there is a need for a system and method for interfacing to a universal serial bus which avoids these and other problems of known systems and methods, and it is to this end that the present invention is directed.

SUMMARY OF THE INVENTION

The invention provides a universal serial bus interface system and method in which the configuration information for a plurality of different peripheral devices may be stored in the host computer rather than in the peripheral devices themselves. The flexibility of the universal serial bus is thereby increased because each peripheral device does not need to store configuration information. In addition, the configuration information for any peripheral device may be easily modified to accommodate changes in the peripheral devices or to take advantage of other peripheral device features because it is located in the file system of the host computers. The configuration information may include configuration data, microprocessor code to be executed on the CPU in the peripheral device, and logic configuration data. The configuration information may be downloaded from the host computer into the peripheral device.

In addition, the universal serial bus interface system and method permits the configuration information associated with the peripheral device to be electronically altered to match changes in the peripheral devices. Instead of physically disconnecting and reconnecting a peripheral device to reconfigure it, a peripheral device may be electronically disconnected and then reconnected to the USB (e.g. the disconnect/connect cycle may be electrically simulated) so that a change in the configuration information for a particular peripheral device may be implemented. One of many advantages of the electrical simulation of the disconnect and reconnect cycle is that since the peripheral device is physically connected to the bus during the electrical simulation, the peripheral device may utilize the electrical power supplied by the bus to operate the peripheral device. If the peripheral device is physically disconnected as in a conventional USB system, the peripheral device would require its own electrical power source. Thus, the computer system may, without human assistance, reconfigure a peripheral device connected to the USB.

In addition, the universal serial bus interface system and method may be a single semiconductor chip which may be incorporated into a plurality of peripheral devices made by a plurality of manufacturers. The chip may initially have a generic configuration (e.g., not specific to a particular peripheral device). Then, the appropriate configuration information for a particular peripheral device and manufacturer may be downloaded to the chip, an electronic simulation of the disconnection and reconnection of the peripheral device occurs, the peripheral device is recognized as a new, manufacturer specific peripheral device and the appropriate software device driver is loaded into the memory of the host computer.

In accordance with the invention, a system and method for reconfiguring a peripheral device connected by a computer bus and port to a host computer is provided in which a host computer detects a peripheral device connected to the port in which the peripheral device has a first configuration. A second set of configuration information may be downloaded from the host computer into the peripheral device over the computer bus, and the configuration of the peripheral device is electronically reset from said first configuration to a second configuration based on the second set of configuration information.

In accordance with another aspect of the invention, a peripheral interface device for a standardized computer peripheral device bus and port is provided in which a peripheral device is physically connected to a computer system through a computer peripheral bus and port and the peripheral device has a first configuration. A second set of configuration information may be received from a computer system, and a physical disconnection and reconnection of the peripheral device is simulated to reconfigure the peripheral device to a second configuration based on the second configuration information.

DETAILED DESCRIPTION OF A PREFERRED EMBODIMENT

The invention is particularly applicable to a universal serial bus interface system and method. It is in this context that the invention will be described. It will be appreciated, however, that the system and method in accordance with the invention has greater utility, such as with other different computer buses and standardized interfaces.

Figure 1:
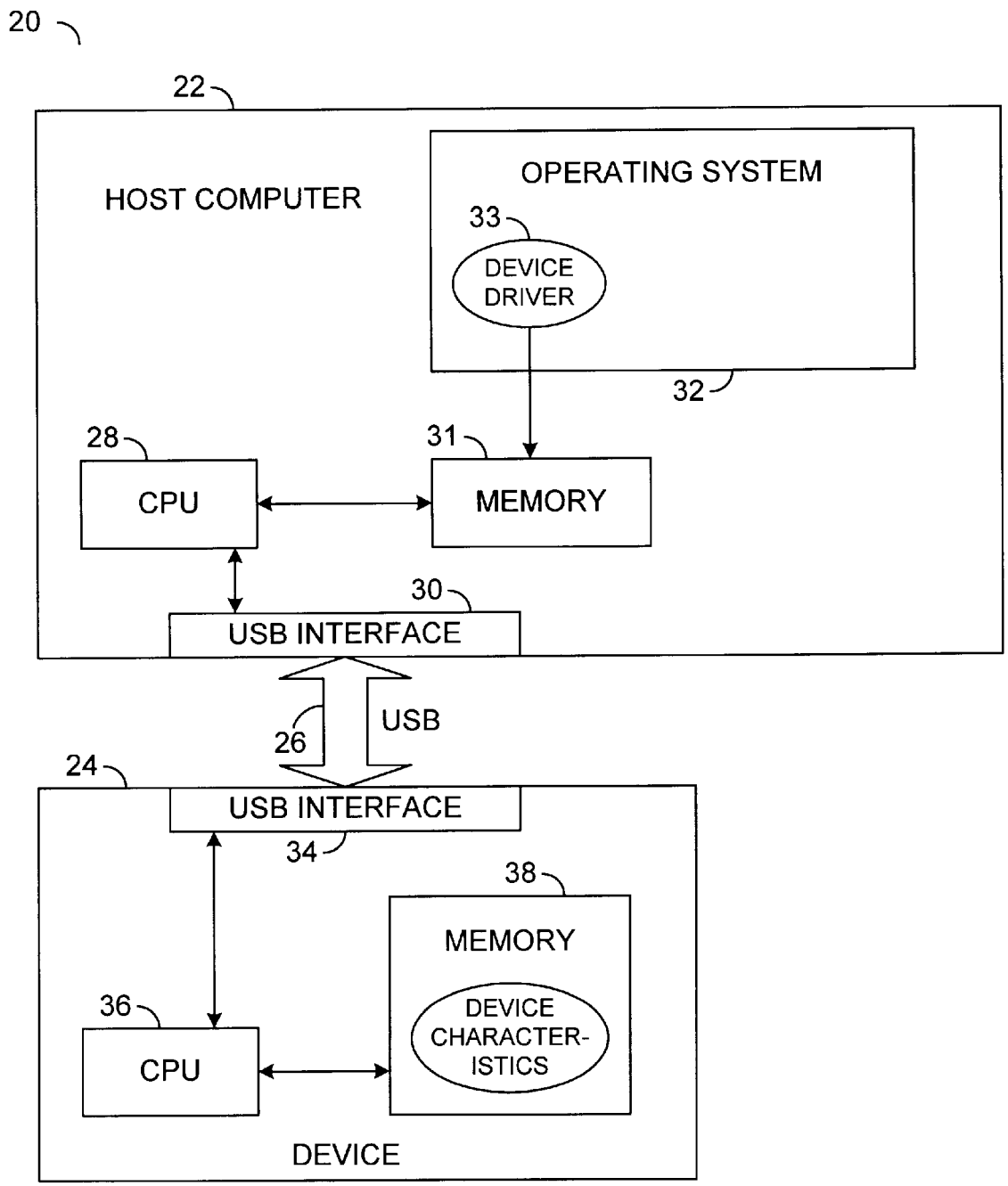
FIG. 1 is a diagram illustrating a conventional universal serial bus system in a computer system.

FIG. 1 is a diagram illustrating a standardized bus interface, such as a conventional computer system 20, that may include a host computer system 22 and a peripheral device 24. The peripheral device is connected to the host computer by a universal serial bus (USB) 26. The host computer may include a central processing unit (CPU) 28 connected to a USB interface (I/F) circuit 30, and the USB standard provides a universal electrical and physical interface for the peripheral devices via bus 26. The CPU executes software application code located in a memory 31 and communicates data to and from the peripheral device through the USB interface and the USB 26. The host computer may also include an operating system 32 which may include a software device driver 33. The peripheral device 24 may include a USB interface circuit 34, a CPU 36 and a non-volatile memory 38 that may store configuration information describing the characteristics of the peripheral device. The non-volatile memory may be a read only memory (ROM) or an erasable programmable read only memory (EPROM).

When the peripheral device is initially connected to the USB, an enumeration process is conducted in which the host computer determines the characteristics of the peripheral device by receiving the configuration information from the memory 38 within the peripheral device, and configures the USB according to the characteristics of the peripheral device. As shown, the configuration information about the characteristics of the peripheral device in a conventional USB system is stored in a non-volatile memory 38 on the peripheral device. The data about the characteristics of the peripheral device is programmed into the non-volatile memory at the factory, and the characteristics of the peripheral device may not be easily altered. In addition, the memory in the peripheral device stores all of the configuration information about the peripheral device which may require a large amount of memory in the peripheral device.

Once the enumeration process has been completed, the CPU of the host computer may load an appropriate software device driver 33 for the peripheral device and the software applications being executed by that CPU of the host computer may communicate with the peripheral device using the USB. When the first peripheral device is disconnected and another peripheral device is connected to the USB, the enumeration process for the new peripheral device may be conducted and another software device driver may be loaded. The configuration of the peripheral device cannot be easily altered. Now, a universal serial bus system and method in accordance with the invention will be described.

Figure 2:
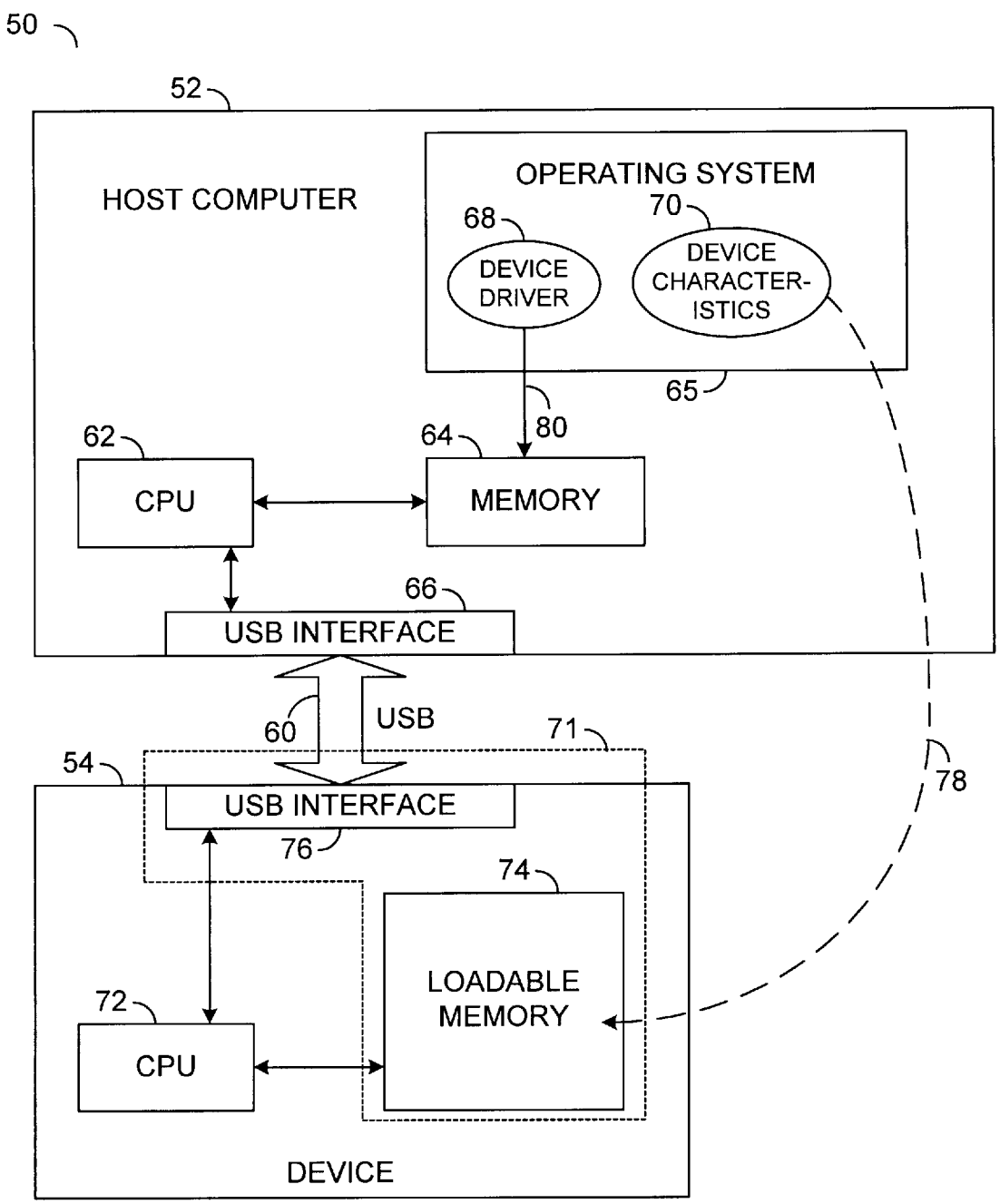
FIG. 2 is a diagram illustrating a universal serial bus system in accordance with the invention.

FIG. 2 is a diagram illustrating a computer system 50 that may have a universal serial bus system in accordance with the invention. The computer system may include a host computer 52 connected to a peripheral device 54 by a universal serial bus (USB) 60. The host computer may include a CPU 62, a memory 64, an operating system 65 and a USB interface circuit 66. One or more peripheral device drivers, such as a first peripheral device driver 68, may be stored in the operating system 65. Each device driver contains information about the proper configuration of the USB for a particular class of peripheral devices. The operating system within the host computer may also contain a plurality of different configuration information sets 70, which may include configuration data for a particular peripheral device (including which device driver to use), microprocessor code to be executed by a CPU located in the peripheral device, or logic configuration data to configure logic circuits in the peripheral device. This invention advantageously enables these configuration information sets to be updated or altered easily since they are located in the host computer and not in a non-volatile memory in the peripheral device.

The peripheral device 54 may include a USB interface system 71 and a CPU 72. The USB interface system may include an alterable memory 74 such as a random access memory (RAM) or a flash electrically erasable programmable read only memory (flash EPROM), and a USB interface circuit 76. The memory 74 may initially contain an identification code to indicate which configuration information set should be downloaded to the peripheral device. The USB interface system 71 may be a semiconductor chip containing the USB interface circuit as well as the memory that may be added onto the peripheral device. The USB interface circuit in accordance with the invention is designed to meet USB standard specifications, such as communications protocols, electrical specifications and the USB form factor, and may permit the peripheral device to be disconnected and connected to the USB without the physical disconnection or connection of the peripheral device, as described below.

The various configuration information sets are stored in the host computer so that they may be easily updated or altered and then, using the electronic disconnect and reconnect method in accordance with the invention, the peripheral devices attached to the host computer may be dynamically reconfigured using the updated configuration information sets without the necessity to physically disconnect and reconnect the peripheral devices.

In operation, during the initial factory configuration of the peripheral device with the USB interface system in accordance with the invention, the memory may store an identification code indicating the appropriate configuration information set to be loaded. Thus, when the peripheral device is first connected to the USB, the configuration information 70, including any microprocessor code applicable to the peripheral device and the appropriate configuration data for the peripheral device may be downloaded over the USB into the memory 74 of the peripheral device 54 as shown by the dashed arrow 78. The electrical simulation of the disconnection and reconnection of the peripheral device from the USB, as described below, may be initiated and a re-enumeration process may occur. During the re-enumeration process, the newly downloaded configuration information may be used to reconfigure the USB for the peripheral device and the host computer may select the appropriate software device driver 68 for the peripheral device based on the configuration information and load the device driver into memory 64 as shown by arrow 80. For example, a plurality of different peripheral devices manufactured by different companies may each include a USB interface system in accordance with the invention. The USB interface system for each peripheral device is identical (e.g. has a USB interface circuit and a memory) except that each memory may contain an identification code that is unique to, for example, a particular manufacturer. When one of the peripheral devices is connected to the USB and the host computer, the appropriate configuration information for the peripheral device, based on the identification code, is downloaded over the USB to the memory of the peripheral device and the appropriate software device driver is loaded into the memory of the host computer. Thus, a plurality of different peripheral device may include the same USB interface system hardware since the configuration information is located in the operating system of the host computer. Now, a conventional USB interface circuit and the universal serial bus interface circuit in accordance with the invention that permits the electronic disconnection and reconnection of the peripheral device will be described.

Figure 3:
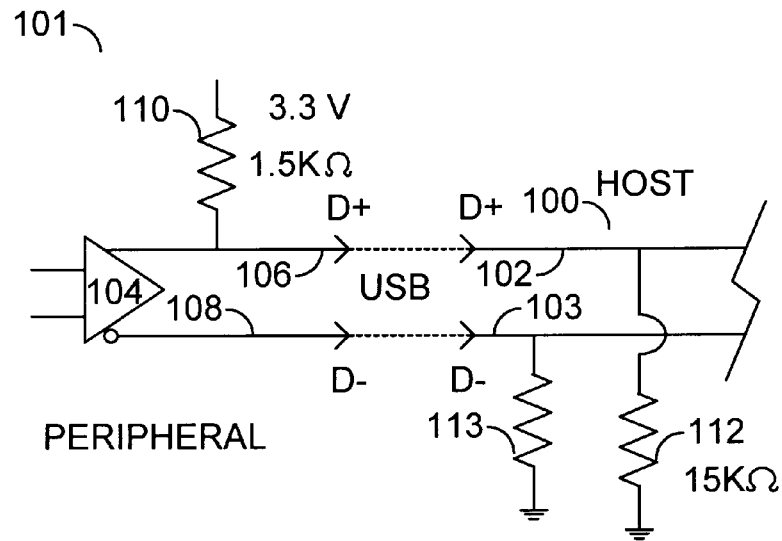
FIG. 3 is a diagram illustrating a conventional universal serial bus interface circuit.

FIG. 3 is a diagram illustrating a conventional host computer universal serial bus interface circuit 100 and a peripheral device USB interface circuit 101. The host computer USB interface 100 may include two USB data leads 102, 103 that may be labeled D+ and D−, which are both connected to ground through a resistor 112, 113 respectively. The peripheral device USB interface 101 may include a buffer amplifier 104, having a first normal output of the buffer (D+) 106 and a second inverted output of the buffer (D−) 108. The D+ output of the buffer may be connected to a supply voltage, which may be 3.3 volts for example, through a 1.5 kΩ resistor 110. In operation, the host computer detects the connection of a peripheral device by monitoring the voltage levels of one of the two USB data leads. In particular, in the computer host, the D+ data line is terminated with a 15 kΩ resistor 112 to ground. Thus, when the D+ line is not connected to a peripheral device, the measured voltage of the D+ line is approximately zero volts and the host computer determines that no peripheral device is connected to the USB port. When a peripheral device is connected to the USB port, the 1.5 kΩ resistor 110 connected to a supply voltage of the peripheral device USB interface 101 adds a voltage to the D+ line and the D+ line at the host computer is pulled to above 3 volts which is detected as a connected peripheral device by the host computer and the host computer begins the enumeration process. Now, the USB interface circuit in accordance with the invention will be described.

Figure 4:
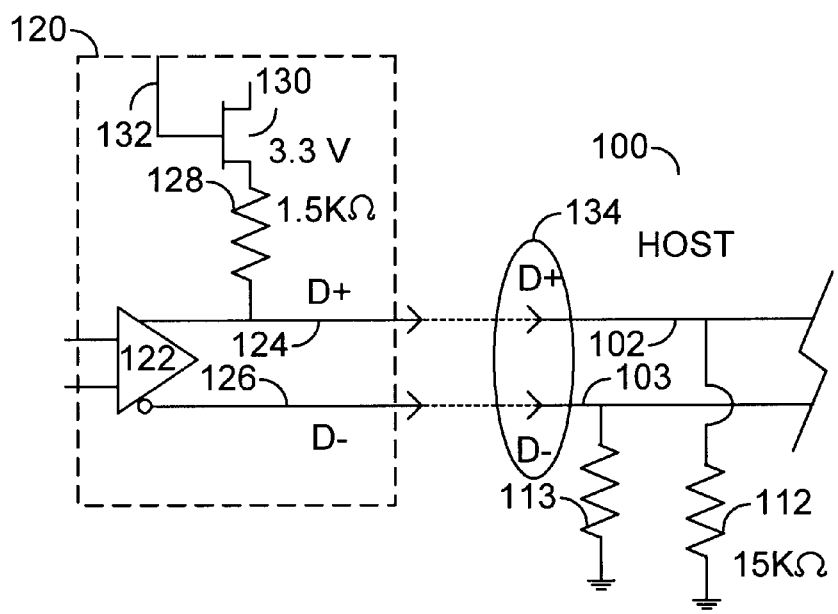
FIG. 4 is a diagram illustrating a universal serial bus interface circuit in accordance with the invention.

FIG. 4 is a diagram illustrating a USB interface circuit for a peripheral device in accordance with the invention which permits the peripheral device to be electronically disconnected and/or reconnected to the USB without physically disconnecting and reconnecting the peripheral device from the USB (e.g., the electric simulation of a disconnect/connect cycle). As with the conventional USB interface, the host computer USB interface circuit 100 may include two USB data leads 102, 103 which may be labeled as D+ and D− as shown. As above, each data lead is connected to ground through a resistor and a 15 kΩ resistor 112 connects the D+ data lead to ground. A peripheral device USB interface circuit 120 in accordance with the invention will now be described.

The peripheral USB interface circuit 120 may include a buffer amplifier 122, a first buffer output 124 labeled D+ and a second buffer output 126 labeled D−. In accordance with the invention, the D+ data lead may be connected to a supply voltage, which may be 3.3 volts, through a 1.5 kΩ resistor 128 and an electrical switch 130, that may be a semiconductor switch such as a field effect transistor (FET). The electrical switch may have a control lead 132 which may control the operation of the electrical switch. The electrical switch is normally controlled by the peripheral device, but the host computer may download configuration information containing a command instructing the peripheral device to actuate the electrical switch. Thus, both the peripheral device itself and the host computer may control the electrical switch. As above, when no peripheral device is physically connected to the USB, the host computer reads zero volts on the D+ data lead.

When a peripheral device is connected to the USB, the electrical switch permits the peripheral device to disconnect and then reconnect itself to the USB without the physical disconnection of the peripheral device from the USB. In particular, if the peripheral device is physically connected to the USB, but the electrical switch is open, the D+ data lead is no longer connected to the supply voltage and the host computer determines that the peripheral device has been disconnected even though the peripheral device is still physically connected to the USB. Similarly, when the electrical switch is closed again, the D+ data lead is again connected to the supply voltage and the host computer will detect that the peripheral device has been reconnected to the USB. Therefore, the physical disconnection and/or connection of the peripheral device may be effected without actually physically disconnection and/or connecting the peripheral device. This electronic disconnection and reconnection of the peripheral device, as described above, in combination with the storage of the configuration information sets on the host computer permits the configuration of the peripheral devices to be changed easily without requiring the physical disconnection and reconnection of a peripheral device. Now, an example of a system for connecting a plurality of different peripheral devices each containing a USB interface system in accordance with the invention, to a computer system will be described.

Figure 5:
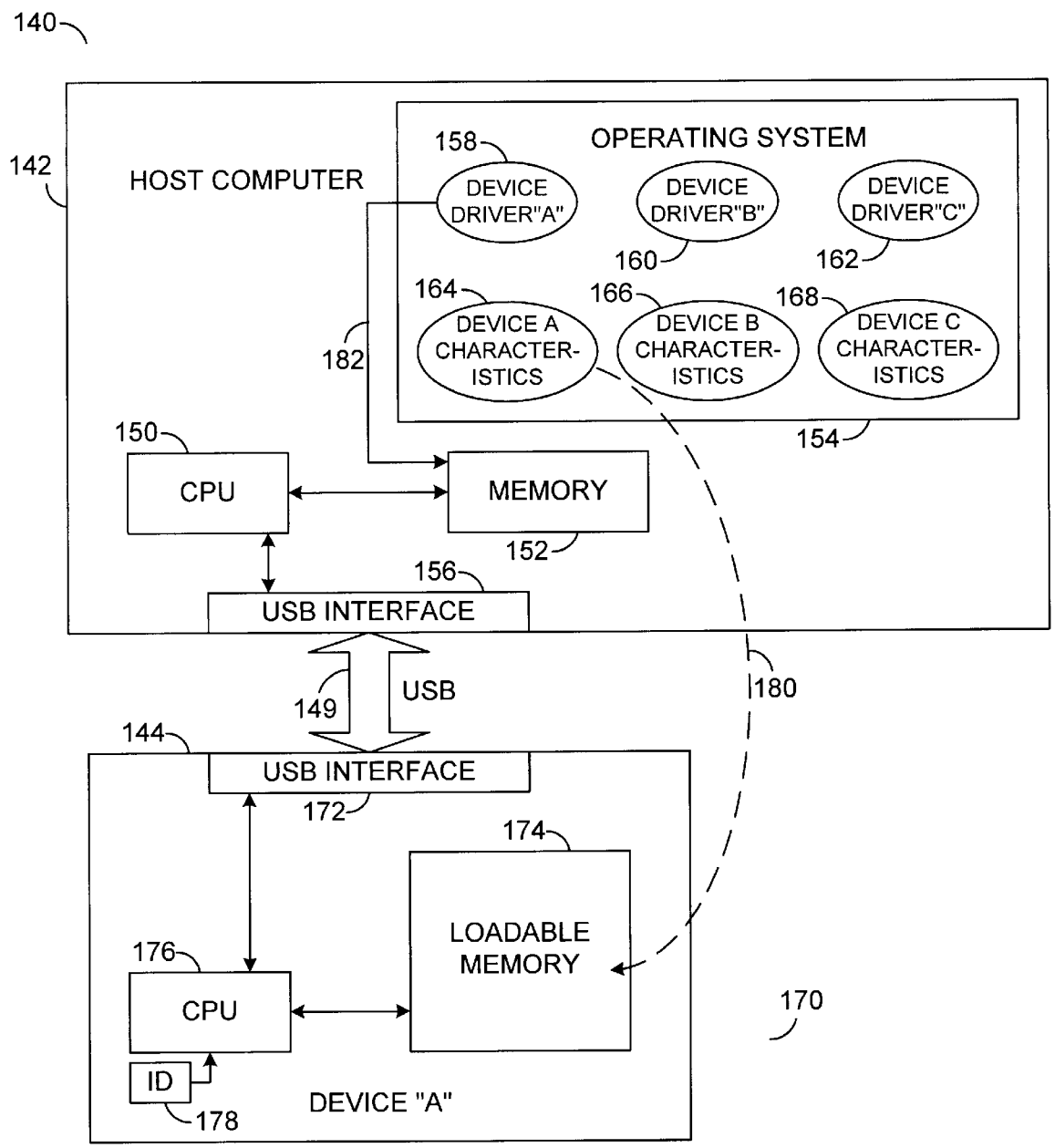
FIG. 5 is a diagram illustrating a peripheral device with a first configuration being connected to a computer system through a USB port and configured in accordance with the invention.
Figure 6:
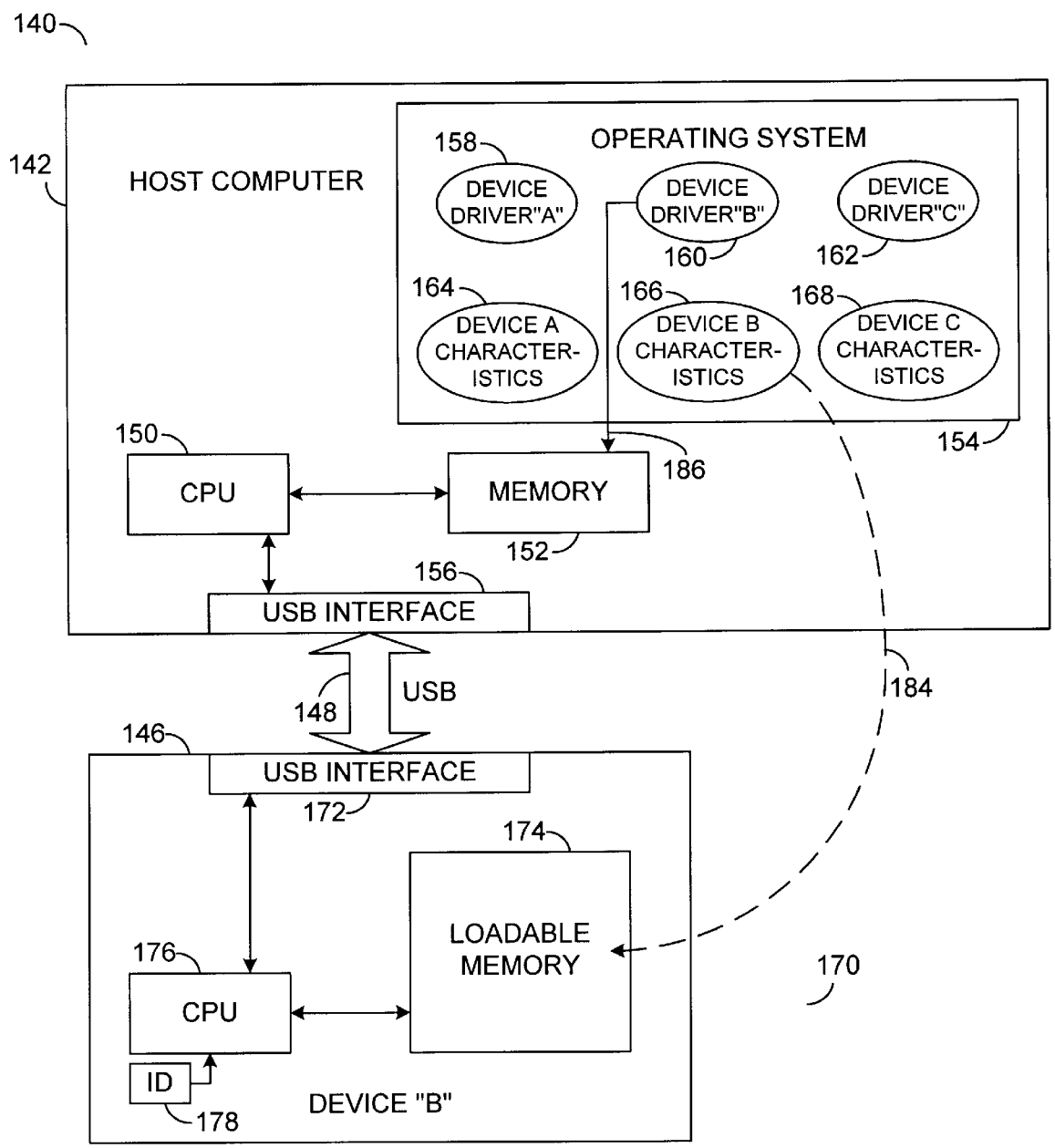
FIG. 6 is a diagram illustrating a peripheral device being configured with a second configuration in accordance with the invention.
Figure 7:
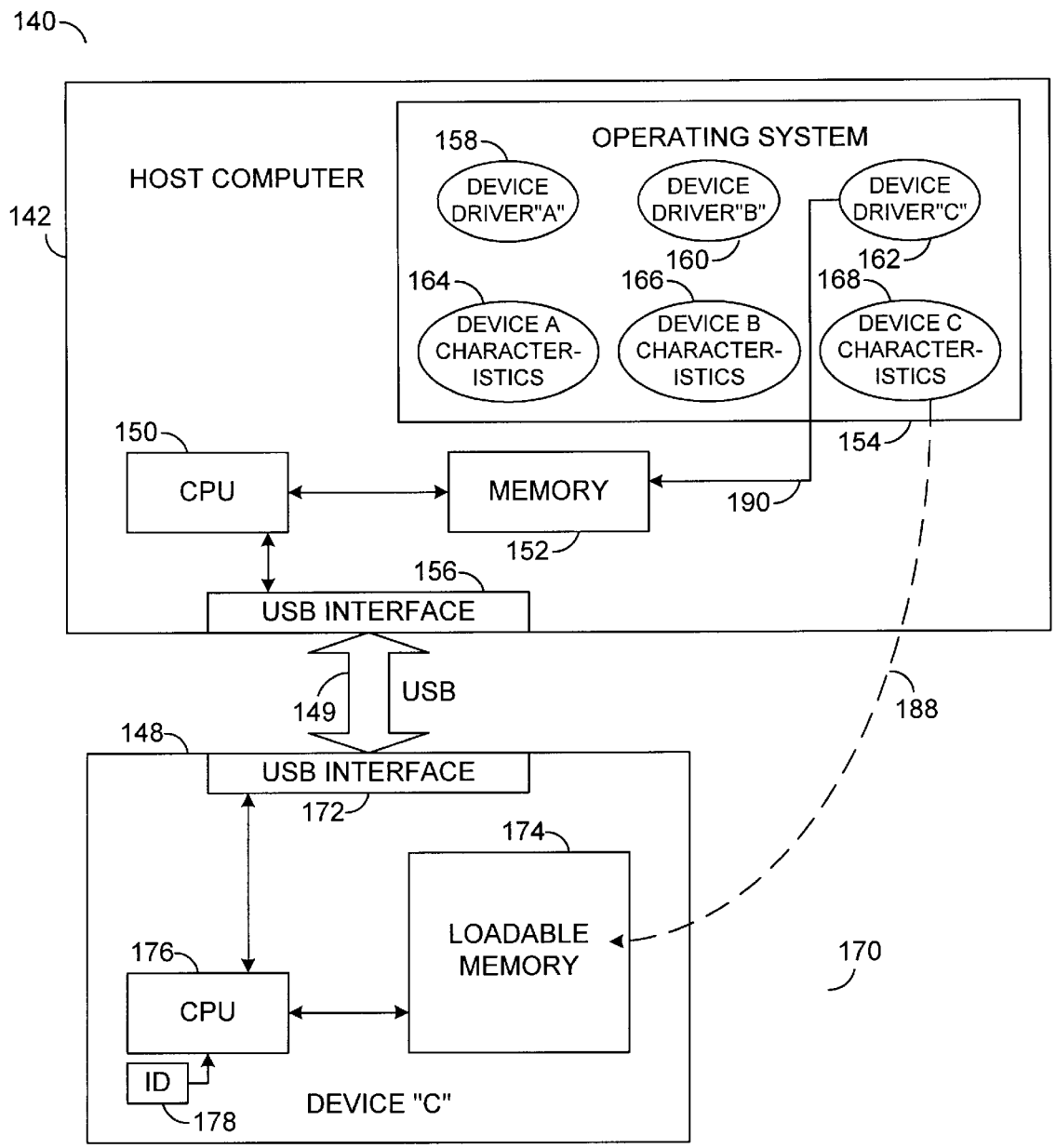
FIG. 7 is a diagram illustrating a peripheral device being reconfigured with a third configuration in accordance with the invention.

FIGS. 5, 6, and 7 are diagrams illustrating three different peripheral devices from different manufacturers, for example, being connected to a host computer in accordance with the invention. In each Figure, a computer system 140 may include a host computer 142, a plurality of peripheral devices, such as peripheral device "A" 144 (shown in FIG. 5), peripheral device "B" 146 (shown in FIG. 6), peripheral device "C" 148 (shown in FIG. 7) and a USB bus 149. The host computer 142 may include a CPU 150, a memory 152, an operating system 154 and a USB interface circuit 156. The operating system, in this example, may include a plurality of software device drivers, such as device driver "A" 158, device driver "B" 160 and device driver "C" 162, and a plurality of configuration information sets, such as device "A" characteristics 164, device "B" characteristics 166 and device "C" characteristics 168.

Each peripheral device 144, 146, 148 may include a universal USB interface system 170 that may include a USB interface circuit 172 as shown in FIG. 4 and a loadable memory 174. Each peripheral device may also include a CPU 176 and a non-volatile memory 178. The non-volatile memory may store a unique manufacture signature or identifier that identifies the appropriate configuration information to be downloaded into the peripheral device. Now, the connection of each of these peripheral device to the computer system will be described.

As shown in FIG. 5, peripheral device "A" 144 may have a unique manufacturer signature in the non-volatile memory 178. When the peripheral device is connected to the computer system, the enumeration process begins in which the USB interface system 170 is recognized by the USB as a generic device and the unique manufacturer signature is read from the non-volatile memory by the CPU 150 over the USB 149. The unique signature identifies device "A" characteristics 164 as the appropriate configuration information and that configuration information may be downloaded over the USB 149 into the memory 174 of the peripheral device as shown by dashed arrow 180. Then the electrical simulation of the disconnection and reconnection of the peripheral device occurs, as described above, which cause re-enumeration of the peripheral device. During re-enumeration, device driver "A" 158, which is identified by device "A" characteristics 164 as the appropriate device driver, is loaded from the operating system into the memory, as shown by arrow 182, such that the peripheral device is now recognized as a peripheral device with device "A" characteristics. Thus, a generic hardware USB interface system may be incorporated into a peripheral device and the particular characteristics for the particular peripheral device may be later downloaded from the host computer into the peripheral device.

Similarly, as shown in FIGS. 6 and 7, the peripheral devices 146, 148 may include the generic USB interface system and a unique manufacturer signature in the non-volatile memory and may be re-enumerated in accordance with the invention so that the appropriate device characteristics are downloaded from the host computer over the USB into the memory of the peripheral device and the appropriate device driver may be selected by the host computer. Thus, peripheral device "B" 146 (shown in FIG. 6) may have device "B" characteristics 166 downloaded into its memory, as shown by dashed arrow 184 in FIG. 6, and the host computer may use device driver "B" 160, as shown by arrow 186 in FIG. 6. The peripheral device "C" 148 (shown in FIG. 7) may have device "C" characteristics 168 downloaded into its memory as shown by the dashed arrow 188 in FIG. 7 and the host computer may use device driver "C" 162 as shown by arrow 190 in FIG. 7. Thus, a generic USB interface system may be incorporated into a plurality of different peripheral devices, the appropriate configuration information may be downloaded into the peripheral device, and the re-enumeration recognizes the peripheral device as a manufacturer specific device. The re-enumeration of the generic peripheral device ensures that the host computer discards all device driver information about the generic connection and loads the manufacturer-specific device driver software.

Figure 8:
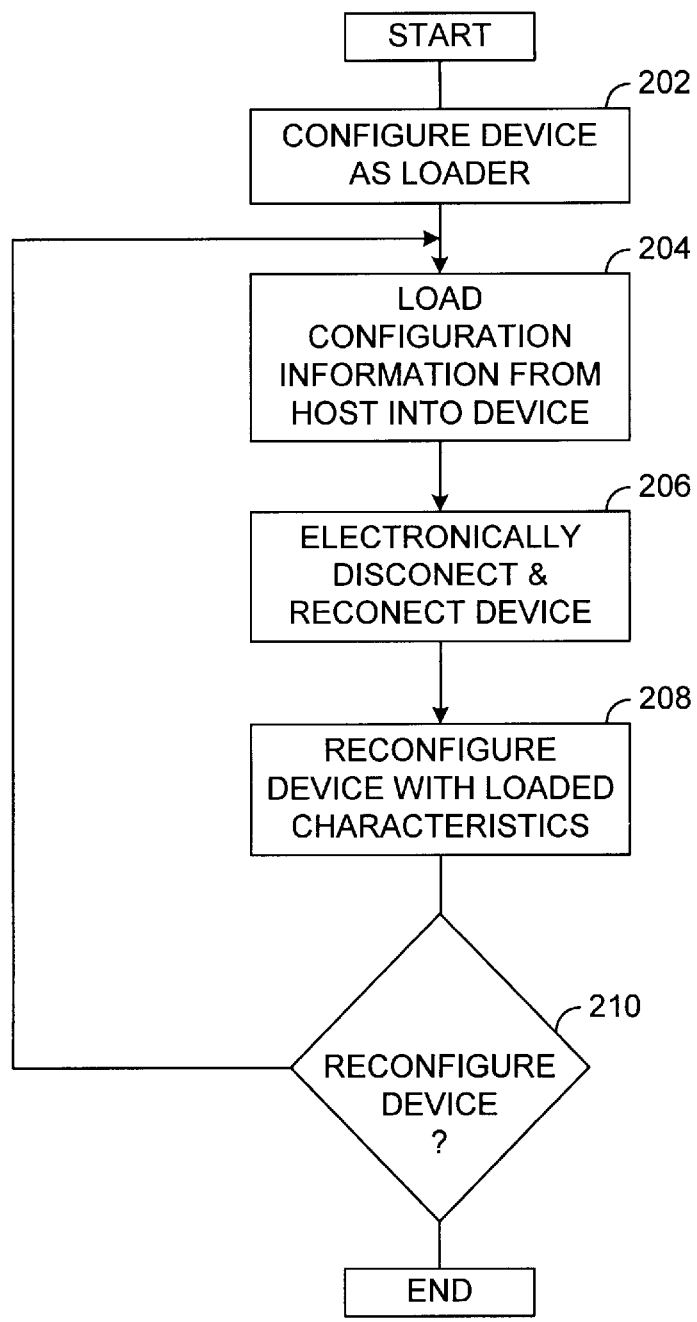
FIG. 8 is a flowchart illustrating a method for changing the configuration information for a peripheral device connected to a universal serial bus in accordance with the invention.

FIG. 8 is a flowchart illustrating a method 200 for reconfiguring or re-enumerating a peripheral device connected to a USB in accordance with the invention. When a peripheral device is initially connected to the USB, the peripheral device may be configured into a generic device in step 202 so that a particular configuration of the peripheral device may be downloaded into the peripheral device in step 204. Next, to cause the host computer to reconfigure the peripheral device, the electronic disconnection and reconnection of the device, as described above, occurs in step 206. Although the electronic disconnection and reconnection of the peripheral device to the USB may be initiated by the peripheral device, it may also be initiated by the host computer, as described above. After the electronic reconnection of the peripheral device, the host computer re-enumerates (step 208) the peripheral device so that the peripheral device has a configuration based on the downloaded configuration information transferred in step 204. The peripheral device may then be used with this configuration once the appropriate device driver is selected by the host computer. Next, at some later time, in step 210, the user of the peripheral device may wish to reconfigure the peripheral device with new configuration information and the method may loop back to step 204 so that the new configuration information for the peripheral device may be downloaded into the peripheral device from the host computer, the peripheral device may be electronically disconnected and reconnected to the USB and the peripheral device may be re-enumerated to operate with the new configuration information. This method may also be used to reconfigure the USB for a plurality of peripheral devices having different configuration information connected by a soft loadable node to the USB, as shown in FIG. 5.

The universal serial bus interface system in accordance with the invention provides several advantages. The system provides an easy technique to associate new device driver software with a peripheral device, known as re-enumeration. A peripheral device may be disconnected and reconnected to the USB without the physical disconnection and reconnection of the peripheral device to cause re-enumeration to occur. In addition, because the peripheral device is not physically disconnected from the host computer, the peripheral device may use the electrical power available over the USB bus to maintain the configuration information if it is in a volatile memory and to perform tasks during the simulated disconnection. The characteristics of the peripheral devices contained in one or more configuration information sets may be stored in the host computer so that the configuration information may be easily changed. The combination of the configuration information sets stored in the host computer and the electronic disconnection and reconnection of the peripheral device permits the characteristics of a peripheral device to be changed rapidly without physical disconnection of the peripheral device. In addition, the configuration of any peripheral device connected to the USB may be altered or changed multiple times. The system also permits a generic USB interface system to be incorporated into a plurality of peripheral devices and then each peripheral device to be configured with manufacturer specific configuration information.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. A system for reconfiguring a peripheral device connected by a computer bus and a port to a host computer, the system comprising:

a first circuit configured to detect the peripheral device connected to the port, wherein the peripheral device has a first configuration;

a second circuit configured to download a second set of configuration information from the host computer into the peripheral device over the computer bus; and a third circuit configured to electronically simulate a physical disconnection and reconnection of the peripheral device to reconfigure the peripheral device to a second configuration based on the second set of configuration information.

2. The system of claim 1, wherein said first configuration is a generic configuration assigned to the peripheral device and said second configuration comprises a unique manufacturer configuration.

3. The system of claim 2, wherein said second circuit is configured to (I) read an identification code from the peripheral device, and (ii) select said second configuration information based on said identification code.

4. The system of claim 3 further comprising a sixth circuit configured to select a device driver based on said second configuration information.

5. The system of claim 1, wherein said third circuit is activated in response to an electrical switch.

6. The system of claim 5, wherein said electrical switch comprises a solid state transistor.

7. The system of claim 5, wherein said computer bus and port comprise a universal serial bus and port.

8. The system of claim 7, wherein said second circuit further comprises a communication circuit configured to communicate said second configuration information to the peripheral device using the universal serial bus and port.

9. The system of claim 7, wherein said second set of configuration information comprises configuration data and executable code.

10. The system of claim 9, wherein said second set of configuration information further comprises logic configuration information.

11. The system of claim 9, wherein said first configuration comprises an initial set of configuration information.

12. The system of claim 9, wherein said peripheral device comprises an execution circuit configured to execute said executable code contained in the second set of configuration information.

13. The system of claim 1, wherein said third circuit comprises a reset circuit configured to reset the configuration of the peripheral device.

14. A method for reconfiguring a peripheral device connected by a computer bus and port to a host computer, the method comprising the steps of:

detecting the peripheral device connected to the port, wherein the peripheral device has a first configuration;

downloading a second set of configuration information from the host computer into the peripheral device over the computer bus; and electronically simulating a physical disconnection and reconnection of the peripheral device to reconfigure the peripheral device to a second configuration based on the second set of configuration information.

15. The method of claim 14, wherein said first configuration comprises generic configuration assigned to the peripheral device and said second configuration comprises a unique manufacturer configuration.

16. The method of claim 15, wherein said downloading step comprises:

reading an identification code from the peripheral device, and selecting said second set of configuration information based on said identification code.

17. The method of claim 16 further comprising selecting a device driver in the host computer based on said second set of configuration information.

18. The method of claim 14, wherein said electronic connecting and disconnecting of said peripheral device respond to an electrical switch.

19. The method of claim 14, wherein downloading comprises communicating said second set of configuration information to the peripheral device using a universal serial bus and port.

20. The method of claim 19, wherein said second set of configuration information comprises configuration data and executable code.

21. The method of claim 20, wherein said second set of configuration information further comprises logic configuration information.

22. The method of claim 20, wherein said peripheral device comprises executing said executable code contained in the second set of configuration information.

23. The method of claim 14, wherein said simulating comprises electronically resetting the configuration of the peripheral device, controllable by the peripheral device.

24. A peripheral interface device for a computer peripheral bus and port, comprising:

means for physically connecting a peripheral device to a computer system through the computer peripheral bus, wherein the peripheral device has a first configuration;

means for receiving a second set of configuration information from a computer system over the computer peripheral bus and port; and means for electronically simulating a physical disconnection and reconnection of the peripheral device to reconfigure the peripheral device to a second configuration based on the second set of configuration information.

25. The device of claim 24, wherein said means for electronic simulation comprises an electrical switch.

26. The device of claim 25, wherein said electrical switch comprises a solid state transistor.

27. The device of claim 26, wherein said computer peripheral bus and port comprise a universal serial bus and port.

28. The device of claim 27, wherein said downloading means comprises means for communicating said second configuration information to the peripheral device using the universal serial bus and port.

29. The device of claim 27, wherein said second set of configuration information comprises configuration data, executable code and logic configuration information.

30. The device of claim 29, wherein said first configuration comprises a generic configuration and said second configuration comprises a manufacturer specific configuration.

31. The device of claim 30 further comprising means for storing an identification code that is read out by the computer system to select said second set of configuration information.

32. The device of claim 29, wherein said peripheral device comprises means for executing said executable code contained in the second set of configuration information.

33. The device of claim 24, wherein said electronic simulating means comprises means for electronically resetting the configuration of the peripheral device.

* * * * *